US011909096B2

(12) United States Patent
Ayotte et al.

(10) Patent No.: US 11,909,096 B2
(45) Date of Patent: Feb. 20, 2024

(54) MECHANICALLY ADJUSTABLE ANTENNA POSITIONING SYSTEM

(71) Applicant: Antenna Research Associates, Inc., Laurel, MD (US)

(72) Inventors: Keith Ayotte, Hudson, NH (US); Sandeep Palreddy, Springfield, MA (US); Scott Weber, Westborough, MA (US); Tyler McSorley, Nashua, NH (US); Nicholas Keith, Stoughton, MA (US)

(73) Assignee: Antenna Research Associates, Inc., Laurel, MD (US)

( * ) Notice: Subject to any disclaimer, the term of this patent is extended or adjusted under 35 U.S.C. 154(b) by 0 days.

(21) Appl. No.: 17/534,971

(22) Filed: Nov. 24, 2021

(65) Prior Publication Data

US 2022/0166124 A1 May 26, 2022

Related U.S. Application Data

(60) Provisional application No. 63/118,492, filed on Nov. 25, 2020.

(51) Int. Cl.
*H01Q 3/02* (2006.01)
*H01Q 1/12* (2006.01)
*H01Q 19/13* (2006.01)

(52) U.S. Cl.
CPC ......... *H01Q 1/1264* (2013.01); *H01Q 1/1257* (2013.01); *H01Q 3/02* (2013.01); *H01Q 19/134* (2013.01)

(58) Field of Classification Search
CPC ....... H01Q 19/193; H01Q 19/132–134; H01Q 13/00; H01Q 15/161; H01Q 1/288; H01Q 1/08
See application file for complete search history.

(56) References Cited

U.S. PATENT DOCUMENTS

| | | | | |
|---|---|---|---|---|
| 2,881,435 A * | 4/1959 | Butler | H01Q 19/134 343/837 |
| 6,166,700 A * | 12/2000 | Jenkin | H01Q 1/125 343/882 |
| 10,418,712 B1 * | 9/2019 | Henderson | H01Q 19/134 |
| 10,622,725 B2 * | 4/2020 | Barratt | H01Q 1/088 |
| 10,847,892 B2 * | 11/2020 | Pla | H01Q 1/125 |

(Continued)

FOREIGN PATENT DOCUMENTS

| | | | | |
|---|---|---|---|---|
| CN | 201838708 U * | 5/2011 | | |
| EP | 3480885 A1 * | 5/2019 | | B64G 1/222 |
| JP | 2002299940 A * | 10/2002 | | |

*Primary Examiner* — Ab Salam Alkassim, Jr.
*Assistant Examiner* — Anh N Ho
(74) *Attorney, Agent, or Firm* — DLA Piper LLP (US)

(57) ABSTRACT

An adjustable antenna positioning system feed is disclosed herein. The adjustable antenna positioning system feed includes a feed base, a splash plate assembly, and a feed insert. The feed base is configured to be coupled to a reflector. The splash plate assembly is configured to be removably coupled to the feed base. The adjustable antenna positioning system feed is in a primary arrangement when directly coupled. The feed insert is positioned between the feed base and the splash plate. The adjustable antenna positioning system feed is in a secondary arrangement when the feed insert is coupled with the feed base and the splash plate.

12 Claims, 6 Drawing Sheets

(56) References Cited

U.S. PATENT DOCUMENTS

2007/0075909 A1* 4/2007 Flynn .................. H01Q 19/132
343/840
2015/0061956 A1* 3/2015 Yano ..................... H01Q 15/16
343/781 CA

* cited by examiner

MECHANICALLY ADJUSTABLE ANTENNA POSITIONING SYSTEM

CROSS-REFERENCE TO RELATED APPLICATIONS

This application claims priority to U.S. Provisional Application Ser. No. 63/118,492, filed Nov. 25, 2020, which is hereby incorporated by reference in its entirety.

FIELD OF DISCLOSURE

The present disclosure generally relates to a mechanically adjustable antenna positioning system.

BACKGROUND

Antenna systems typically point an antenna toward a satellite in geosynchronous orbit above the earth to acquire signals emitted from the transponder of the satellite. Antenna systems typically include a dish or reflector and a feed or a feed horn. The reflector receives the signals broadcast from the satellite transponder and focuses them on a focal point where the feed is located.

SUMMARY

In some embodiments, an adjustable antenna positioning feed, is disclosed herein. The adjustable antenna positioning feed includes a feed base, a splash plate assembly, and a feed insert. The feed base is configured to be coupled to a reflector. The splash plate assembly is configured to be removably coupled to the feed base. The adjustable antenna positioning feed is in a primary arrangement when directly coupled. The feed insert is positioned between the feed base and the splash plate. The adjustable antenna positioning feed is in a secondary arrangement when the feed insert is coupled with the feed base and the splash plate.

In some embodiments, an adjustable antenna positioning feed is disclosed herein. The adjustable antenna positioning feed includes a feed base, a splash plate assembly, and a feed insert. The feed base is configured to be coupled to an antenna positioning reflector. The splash plate assembly is configured to be removably coupled to the feed base. The feed insert is positioned between the feed base and the splash plate. The feed insert is coupled with the feed base and the splash plate.

In some embodiments, an antenna positioning assembly is disclosed herein. The antenna positioning assembly includes a reflector and an adjustable antenna positioning feed. The adjustable antenna positioning feed is coupled with the reflector. The adjustable antenna positioning feed includes a feed base, a splash plate assembly, and a feed insert. The feed base is configured to be coupled to an antenna positioning reflector. The splash plate assembly is configured to be removably coupled to the feed base. The feed insert is positioned between the feed base and the splash plate. The feed insert is coupled with the feed base and the splash plate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Conventionally, ground terminals that use a parabolic dish typically include a separate feed to accommodate various dish sizes. The feed (or feed horn) of the parabolic dish may be the focal point where the RF energy is concentrated on. This focal point varies based on the size and curvature of the dish.

An antenna or dish may refer to a component of a ground terminal that includes a feed. Those skilled in the art recognize, that the described functionality may be applied to a dish feed or, more broadly, an antenna feed.

Figure 1:
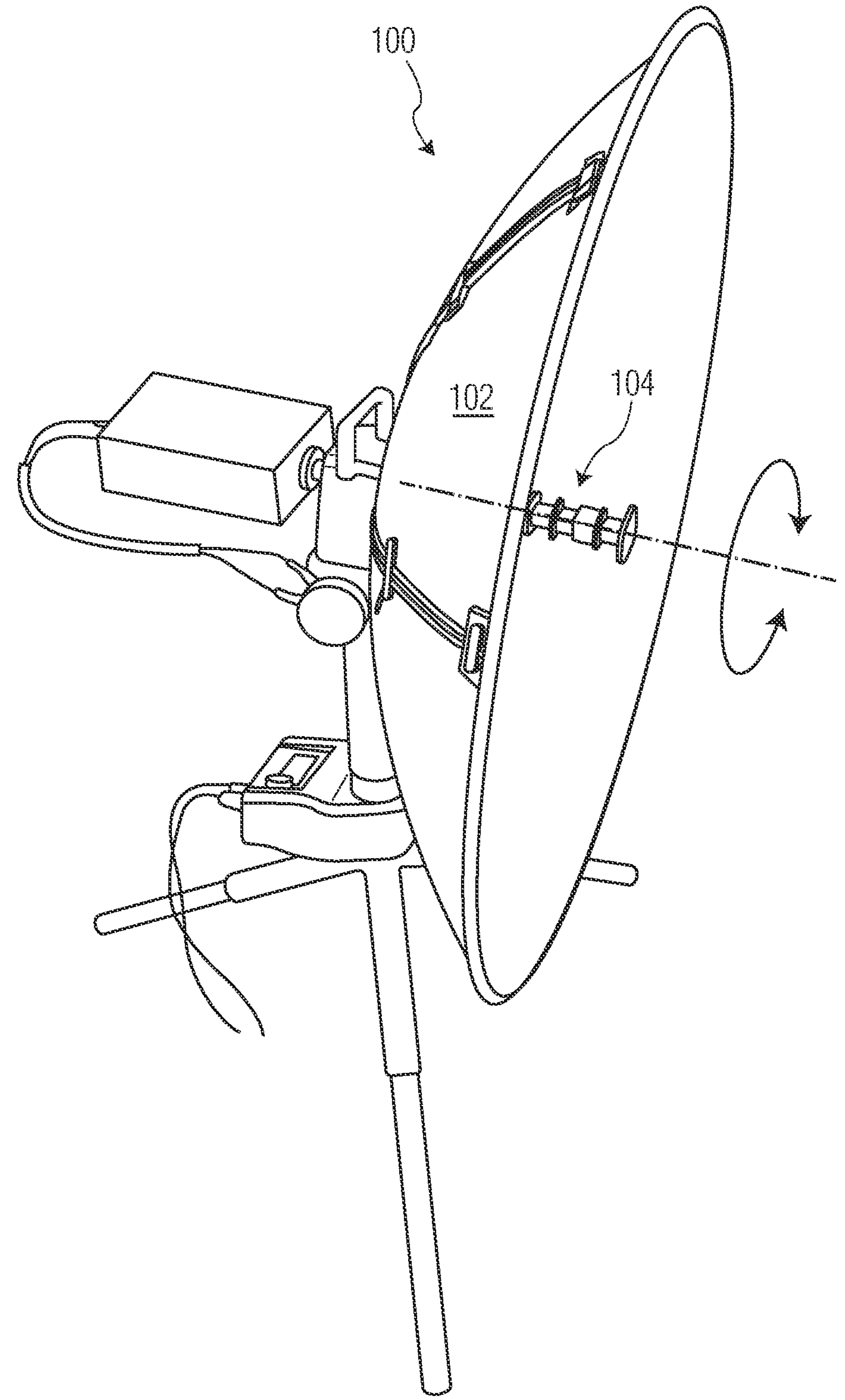
FIG. 1 illustrates an exemplary antenna positioning system, according to some embodiments.

FIG. 1 illustrates an exemplary antenna positioning system 100, according to example embodiments. As shown, antenna positioning system 100 may include at least a reflector 102 and a feed 104. Reflector 102 may be configured to receive or reflect electromagnetic waves. Generally, reflector 102 may be formed of a parabolic shaped body. Reflector 102 may be positioned around feed 104. Feed 104 may be positioned at a focal point of reflector 102. Feed 104 may be configured to receive electromagnetic waves transmitted to antenna positioning system 100 and/or transmit electromagnetic waves from antenna positioning system 100.

In some circumstances, an operator of antenna positioning system 100 may wish to change the size of reflector 102. For example, an operator may wish to maintain several sizes of reflectors 102 (e.g., 60 cm, 80 cm, 100 cm, 130 cm, etc.) and change the size or reflector 102 accordingly. Conventionally, in order to operate an antenna positioning system 100 properly with varying dimensions and or bands, an operator would need to purchase a new feed 104. This is because, in order for antenna positioning system 100 to operate properly, feed 104 may be positioned at the focal point of reflector 102. As such, once the size of reflector 102 changes, so does the focal point of reflector 102. Accordingly, in conventional systems, a different sized feed 104 is needed for each size of reflector 102.

The one or more embodiments described herein provides an improvement over conventional antenna positioning systems 100 by providing a mechanically adjustable feed that can be dynamically modified to account for changes in reflector size.

Figure 2A:
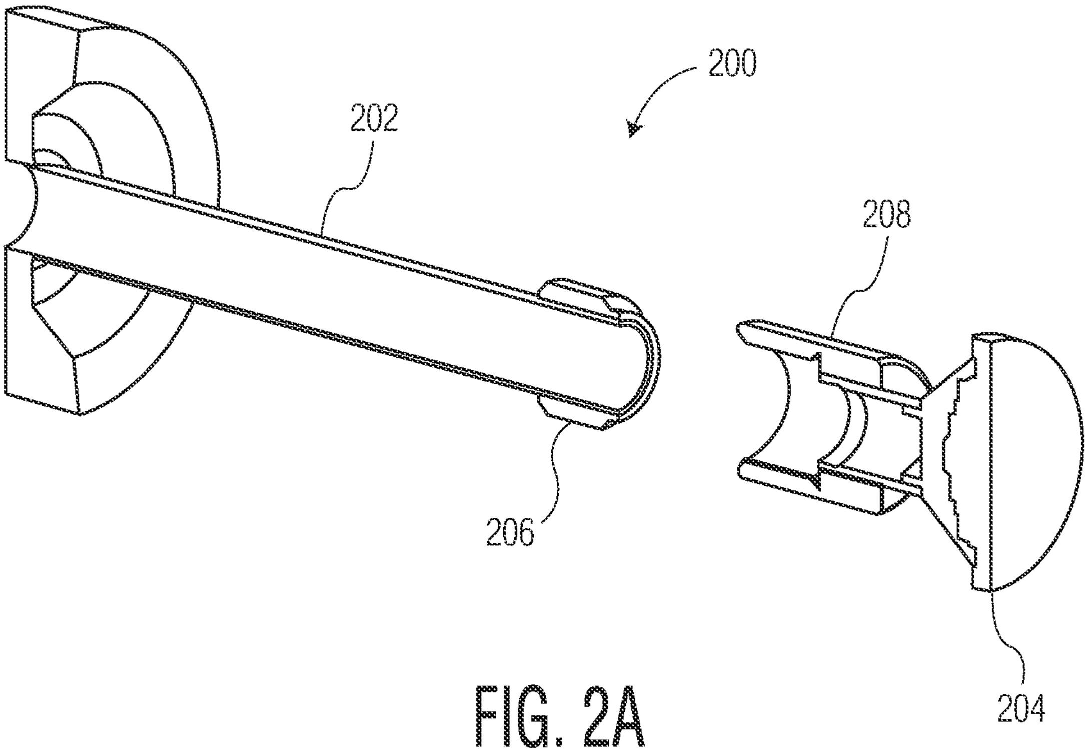
FIG. 2A illustrates an adjustable feed, according to example embodiments.
Figure 2B:
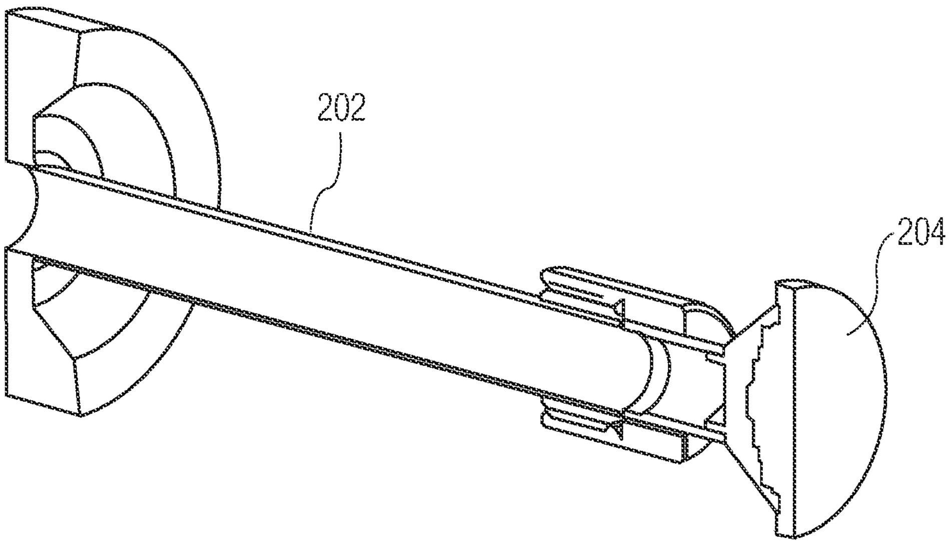
FIG. 2B illustrates an adjustable feed, according to example embodiments.

FIGS. 2A and 2B illustrate an adjustable feed 200, according to example embodiments. As shown, adjustable feed 200 may include a feed base 202 and a splash plate assembly 204. Feed base 202 may correspond to a component of adjustable feed 200 that may remain constant, regardless of the size of reflector (e.g., reflector 102) used in an antenna positioning system. In some embodiments, feed base 202 may be mounted in the center of the reflector.

In some embodiments, splash plate assembly 204 may be removably coupled with feed base 202. For example, feed base 202 may be removably coupled with splash plate assembly 204 via one or more coupling mechanisms 206 and 208. Splash plate assembly 204 may be configured to act as a feed horn for adjustable feed 200. Generally, each type of splash plate assembly 204 may be frequency dependent. For example, the size and shape of splash plate assembly 204 may define the operating frequency of an antenna positioning system. Because splash plate assembly 204 may be removed from feed base 202, adjustable feed 200 allows for different splash plate assemblies to be used based on a desired frequency for an antenna positioning system. Using a specific example, in an exemplary embodiment, an operator may utilize a first type of splash plate assembly 204 for an X band feed a second type of assembly for a Ka band feed, and a third type of assembly for a Ku band. In this manner, an operator can adjust the operating frequency of an antenna positioning system without replacing the entire feed assembly.

Figure 3A:
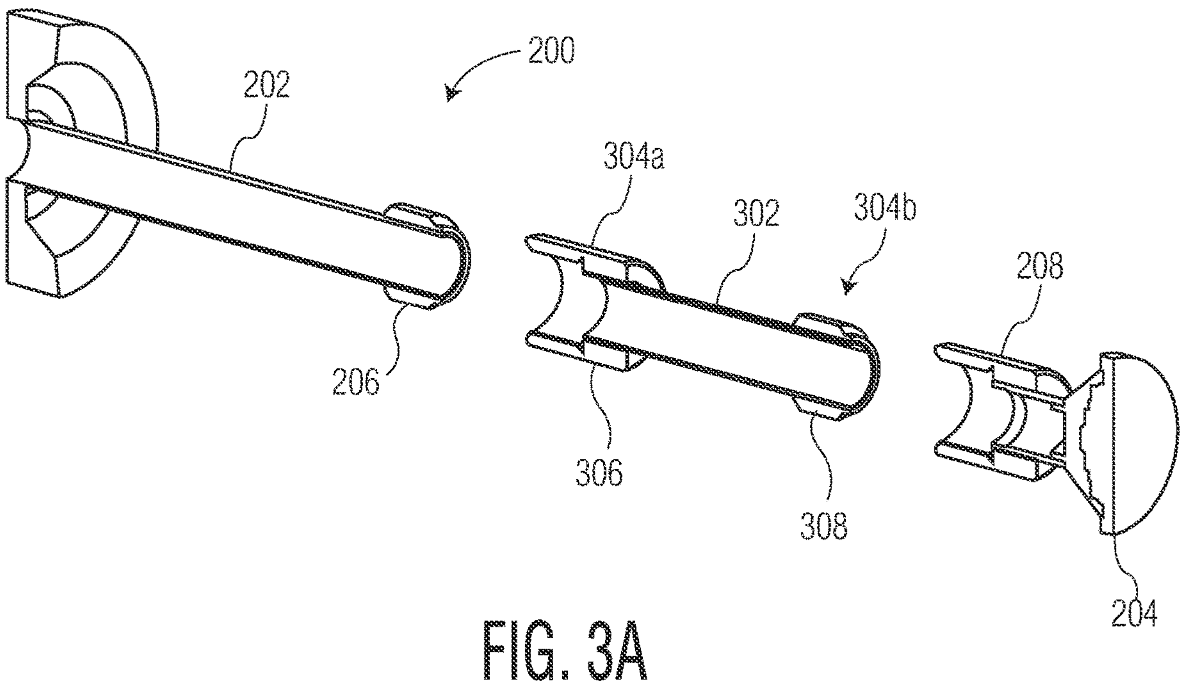
FIG. 3A illustrates an adjustable feed, according to example embodiments.
Figure 3B:
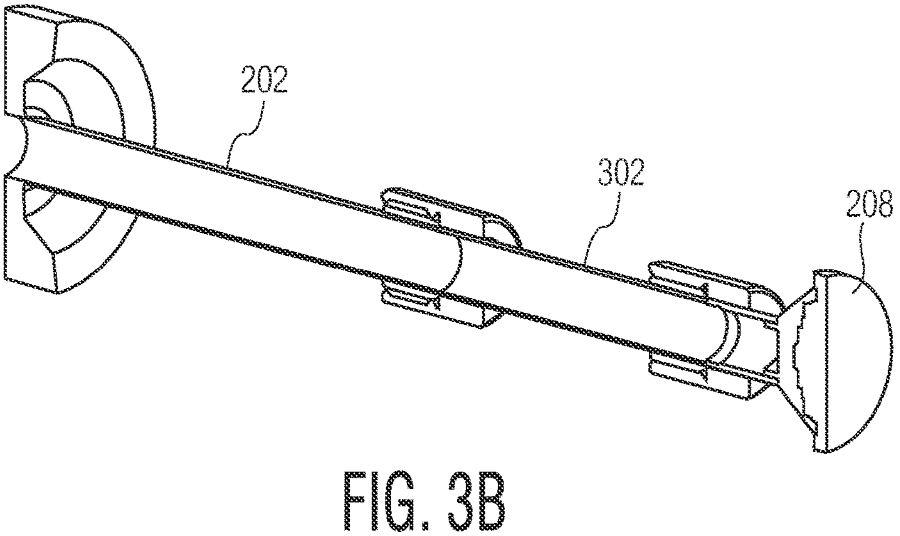
FIG. 3B illustrates an adjustable feed, according to example embodiments.

FIGS. 3A and 3B illustrate adjustable feed 200, according to example embodiments. In some embodiments, an operator of an antenna positioning system may wish to change a size of its reflector. For example, an operator of an antenna positioning system may wish to utilize a larger reflector. In this manner, the operator may need a longer feed in order to be correctly positioned at the new focal point. To account for this, adjustable feed 200 may further include a feed insert 302 having a first end 304*a* and a second end 304*b*.

In some embodiments, feed base 202 may be removably coupled with feed insert 302 at a first end 304*a* of feed insert 302. For example, feed base 202 may be removably coupled with feed insert 302 at first end 304*a* via coupling mechanisms 206 and 306. Feed insert 302 may be selectively added to adjustable feed 200 to change a length of adjustable feed 200. Continuing with the above example, feed insert 302 may be added to adjustable feed 200 to account for a new focal point.

To complete adjustable feed 200, feed insert 302 may be removably coupled with splash plate assembly 204 at second end 304*b*. For example, feed insert 302 may be removably coupled with splash plate assembly via coupling mechanisms 308 and 208.

Although FIGS. 3A and 3B are shown and discussed with respect to adding a single feed insert 302, those skilled in the art understand that multiple feed inserts 302 may be added to further extend a total length of adjustable feed 200. For example, multiple feed inserts 302 may positioned between feed base 202 and splash plate assembly 204 to account for varying focal points. Further, because adjustable feed 200 also allows for the interchanging of splash plate assemblies 204, depending on a desired operating frequency, adjustable feed 200 provides a dynamic feed for an antenna positioning system that can allow for both various sizes of reflectors (e.g., by adding or subtracting feed inserts 302) and various operating frequencies (e.g., by swapping out splash plate assemblies 204).

Figure 5A:
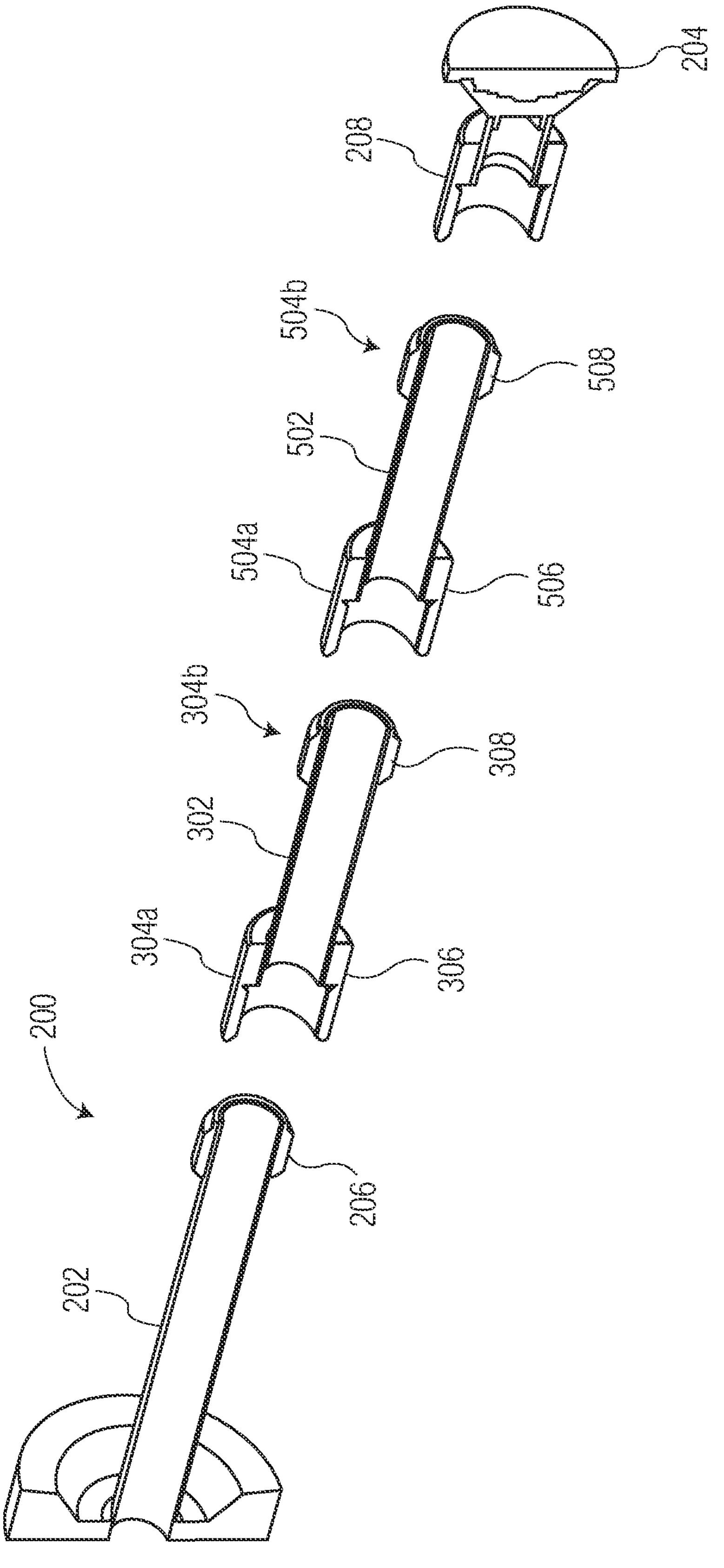
FIG. 5A illustrates an adjustable feed, according to example embodiments
Figure 5B:
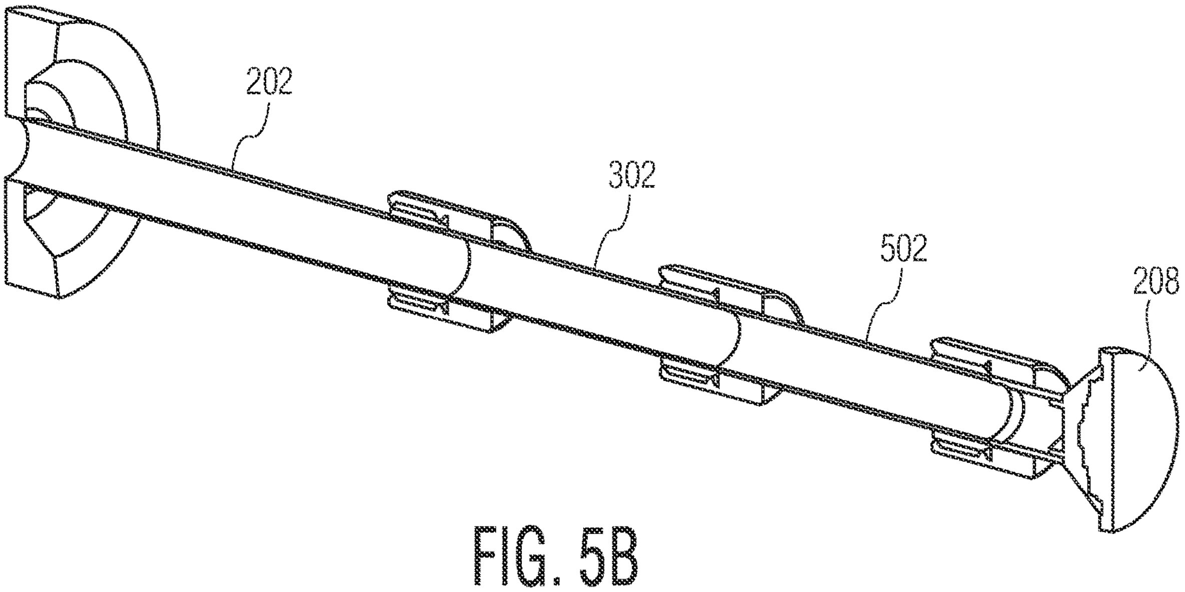
FIG. 5B illustrates an adjustable feed, according to example embodiments.

For example, FIGS. 5A and 5B illustrate second adjustable feed 200 with a further feed insert 502 positioned between feed base 202 and splash plate assembly 204, according to example embodiments. Further feed insert 502 may be configured similar to feed insert 302. For example, further feed insert 502 may include a first end 504*a* and a second end 504*b*. First end 504*a* of further feed insert 502 may interface with second end 304*b* of feed insert 302 via coupling mechanisms 308 and 508. Second end 504*b* of further feed insert 502 may interface with splash plate assembly 204 via coupling mechanisms 208 and 508.

Figure 4:
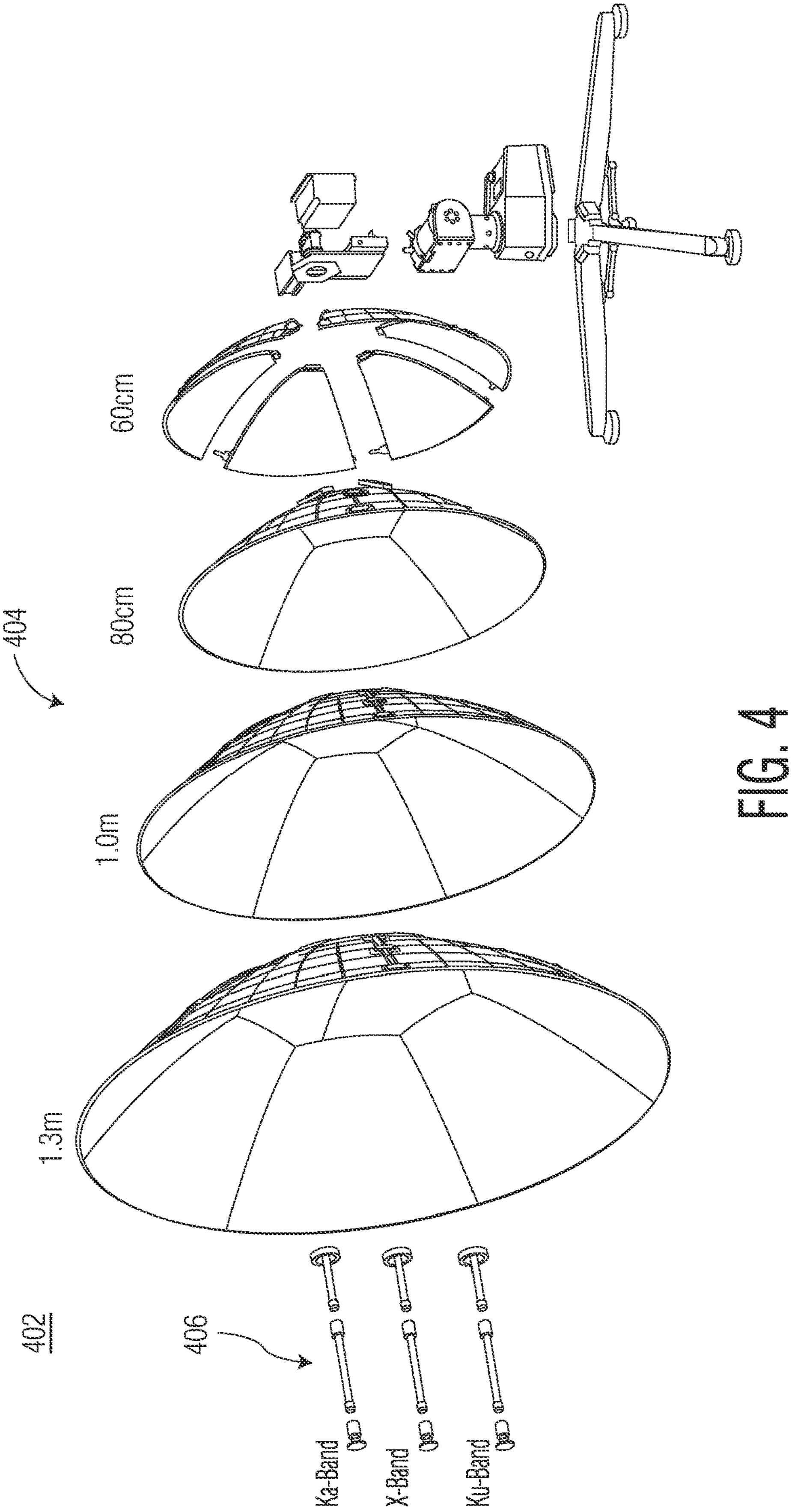
FIG. 4 illustrates various antenna positioning assemblies 402, according to example embodiments.

FIG. 4 illustrates various antenna positioning system 402, according to example embodiments. As shown, various antenna positioning systems 402 may include one or more reflectors 404 and one or more adjustable feeds 406. Each reflector 404 may correspond to a differently sized adjustable feed 406, depending on a focal point of each respective reflector 404. Similarly, each adjustable feed 406 may one or more feed inserts based on the focal point of each respective reflector 404. Further, each adjustable feed 406 may include a different splash plate assembly based on a desired operating frequency.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. An adjustable antenna positioning system feed, comprising:

a feed base configured to be coupled to a reflector;

a splash plate assembly configured to be removably coupled to the feed base, wherein the adjustable antenna positioning system feed is in a primary arrangement when the feed base is directly coupled with the splash plate assembly;

a feed insert positioned between the feed base and the splash plate assembly, wherein the adjustable antenna positioning system feed is in a secondary arrangement when the feed insert is coupled with the feed base and the splash plate assembly; and a further feed insert positioned between the feed base and the splash plate assembly, the further feed insert comprising a first end and a second end, wherein the first end is removably coupled with the feed insert and the second end is removably coupled with the splash plate assembly.

2. The adjustable antenna positioning system feed of claim 1, wherein the feed insert is removably coupled with the feed base at a first end of the feed insert.

3. The adjustable antenna positioning system feed of claim 2, wherein the feed insert is removably coupled with the further feed insert at a second end of the feed insert.

4. The adjustable antenna positioning system feed of claim 1, wherein a total length of the feed base, the splash plate assembly, the feed insert, and the further feed insert is dictated by a size of the reflector.

5. An adjustable antenna positioning system feed, comprising:

a feed base configured to be coupled to a reflector;

a splash plate assembly configured to be removably coupled to the feed base;

a feed insert positioned between the feed base and the splash plate assembly, the feed insert coupled with the feed base and the splash plate assembly; and a further feed insert positioned between the feed base and the splash plate assembly, the further feed insert comprising a first end and a second end, wherein the first end is removably coupled with the feed insert and the second end is removably coupled with the splash plate assembly.

6. The adjustable antenna positioning system feed of claim 5, wherein the feed insert is removably coupled with the feed base at a first end of the feed insert.

7. The adjustable antenna positioning system feed of claim 6, wherein the feed insert is removably coupled with the further feed insert at a second end of the feed insert.

8. The adjustable antenna positioning system feed of claim 5, wherein a total length of the feed base, the splash plate assembly, the feed insert, and the further feed insert is dictated by a size of the reflector.

9. An antenna positioning system comprising:

a reflector; and an adjustable antenna positioning system feed coupled with the reflector, the adjustable antenna positioning system feed comprising:

a feed base;

a splash plate assembly configured to be removably coupled to the feed base;

a feed insert positioned between the feed base and the splash plate assembly, the feed insert coupled with the feed base and the splash plate assembly; and a further feed insert positioned between the feed base and the splash plate assembly, the further feed insert comprises a first end and a second end, wherein the first end is removably coupled with the feed insert and the second end is removably coupled with the splash plate assembly.

10. The antenna positioning system of claim 9, wherein a total length of the adjustable antenna positioning system feed is dictated by a size of the reflector.

11. The antenna positioning system of claim 10, wherein the reflector has a first diameter and the total length of the adjustable antenna positioning system feed is a first length corresponding to a first focal point of the reflector.

12. The antenna positioning system of claim 11, wherein the reflector has a second diameter and the total length of the adjustable antenna positioning system feed is a second length corresponding to a second focal point of the reflector.

* * * * *